United States Patent
Blackburn et al.

(10) Patent No.: US 8,663,003 B2
(45) Date of Patent: Mar. 4, 2014

(54) ORDERING, DELIVERING, AND LICENSING WAGER GAMING CONTENT

(75) Inventors: Christopher W. Blackburn, Reno, NV (US); Robert T. Davis, Reno, NV (US); Christopher J. Frattinger, Sparks, NV (US); Jeremy Hornik, Chicago, IL (US); Sue Ruebusch, Reno, NV (US); Alfred Thomas, Las Vegas, NV (US); William Wadleigh, Lisle, IL (US); Terry D. Warkentin, Carson City, NV (US)

(73) Assignee: WMS Gaming Inc., Waukegan, IL (US)

( * ) Notice: Subject to any disclaimer, the term of this patent is extended or adjusted under 35 U.S.C. 154(b) by 901 days.

(21) Appl. No.: 11/379,178

(22) Filed: Apr. 18, 2006

(65) Prior Publication Data
US 2006/0258428 A1    Nov. 16, 2006

Related U.S. Application Data

(60) Provisional application No. 60/672,320, filed on Apr. 18, 2005, provisional application No. 60/700,165, filed on Jul. 18, 2005.

(51) Int. Cl.
*A63F 9/24*     (2006.01)
*A63F 13/00*    (2006.01)
*G06F 17/00*    (2006.01)
*G06F 19/00*    (2011.01)

(52) U.S. Cl.
USPC ............................................... 463/29; 463/42

(58) Field of Classification Search
USPC ................................................. 463/29, 42
See application file for complete search history.

(56) References Cited

U.S. PATENT DOCUMENTS

| | | | |
|---|---|---|---|
| 4,335,809 A | 6/1982 | Wain | |
| 4,467,424 A * | 8/1984 | Hedges et al. | 463/26 |
| 5,581,270 A | 12/1996 | Smith et al. | |
| 5,762,552 A * | 6/1998 | Vuong et al. | 463/25 |
| 5,830,068 A * | 11/1998 | Brenner et al. | 463/42 |
| 6,264,561 B1 * | 7/2001 | Saffari et al. | 463/42 |
| 6,379,252 B2 | 4/2002 | Takata et al. | |
| 6,409,602 B1 | 6/2002 | Wiltshire et al. | |
| 6,508,709 B1 * | 1/2003 | Karmarkar | 463/42 |
| 6,526,335 B1 * | 2/2003 | Treyz et al. | 701/1 |
| 6,645,077 B2 | 11/2003 | Rowe | |
| 6,749,510 B2 | 6/2004 | Giobbi | |
| 6,758,746 B1 * | 7/2004 | Hunter et al. | 463/9 |
| 6,810,528 B1 * | 10/2004 | Chatani | 725/109 |

(Continued)

OTHER PUBLICATIONS

U.S. Appl. No. 11/379,176 Non-Final Office Action mailed Mar. 28, 2008, 10 pgs.

(Continued)

*Primary Examiner* — Kevin Y Kim
(74) *Attorney, Agent, or Firm* — Nixon Peabody LLP

(57) ABSTRACT

A system and method for viewing and ordering wager gaming content utilizes a network server to provide an interface to a user coupled to the network. In one embodiment, the server is an Internet web based server, and the user is a thin client, using an Internet browser to view and select wager gaming content. The web based server may be coupled to an order entry system to facilitate ordering and payment for selected wager gaming content. The order entry system may also be coupled to a content server to provide for downloading of selected wager gaming content.

29 Claims, 12 Drawing Sheets

(56) References Cited

U.S. PATENT DOCUMENTS

| | | |
|---|---|---|
| 6,830,515 B2 | 12/2004 | Rowe |
| 6,988,267 B2 | 1/2006 | Harris et al. |
| 6,991,544 B2 * | 1/2006 | Soltys et al. ............. 463/42 |
| 7,186,181 B2 | 3/2007 | Rowe |
| 7,338,376 B2 | 3/2008 | Eck et al. |
| 7,473,178 B2 | 1/2009 | Boyd et al. |
| 7,722,466 B2 | 5/2010 | Rothschild |
| 2002/0013721 A1 * | 1/2002 | Dabbiere et al. ............. 705/7 |
| 2002/0116241 A1 * | 8/2002 | Sandhu et al. ............. 705/7 |
| 2002/0116615 A1 | 8/2002 | Nguyen et al. |
| 2004/0106452 A1 | 6/2004 | Nguyen et al. |
| 2006/0080175 A1 * | 4/2006 | Rowe et al. ............. 705/14 |
| 2006/0084502 A1 * | 4/2006 | Downs et al. ............. 463/29 |
| 2006/0276244 A1 | 12/2006 | Hornik et al. |

OTHER PUBLICATIONS

U.S. Appl. No. 11/379,176 Response filed Feb. 23, 2009 to Final Office Action mailed Oct. 23, 2008, 14 pgs.
U.S. Appl. No. 11/379,176 Response filed Jun. 27, 2008 to Non Final Office Action mailed Mar. 28, 2008, 10 pgs.
U.S. Appl. No. 11/379,176 Advisory Action mailed Mar. 10, 2009, 2 pgs.
U.S. Appl. No. 11/379,176 Response filed Mar. 23, 2009 to Advisory Action mailed Mar. 10, 2009, 20 pgs.
U.S. Appl. No. 11/379,175 Final Office Action mailed Oct. 23, 2008, 1 pg.
U.S. Appl. No. 11/379,179 Response Filed Jan. 20, 2012 to Final Office Action mailed Oct. 23, 2008, 6 pgs.

* cited by examiner

ORDERING, DELIVERING, AND LICENSING WAGER GAMING CONTENT

RELATED APPLICATION

This application claims priority under 35 U.S.C. 119(e) from U.S. Provisional Application Ser. No. 60/672,320 filed Apr. 18, 2005 and from U.S. Provisional Application Ser. No. 60/700,165 filed Jul. 18, 2005, which applications are incorporated herein by reference.

COPYRIGHT

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever. Copyright 2006, WMS Gaming, Inc.

FIELD

This invention relates generally to the field of game content ordering and more particularly to the field of game content ordering utilizing a web based system.

BACKGROUND

Wagering game makers continually provide new and entertaining games. One way of increasing entertainment value associated with casino-style wagering games (e.g., video slots, video poker, video black jack, and the like) includes offering a base game and a variety of bonus events. However, despite the variety of bonus events, players often lose interest in repetitive wager gaming content. In order to maintain player interest, wagering game machine makers frequently update game themes, game settings, bonus events, and other wager gaming content.

In order to satisfy player demands, wager gaming machine operators continuously license and deploy new wager gaming content to wager gaming machines operating in the field. Wager gaming machine operators typically order new wager gaming content via telephone, or via a proprietary interface. For wager gaming machine operators owning scores of machines, this process can be cumbersome.

DESCRIPTION OF THE DRAWINGS

The present invention is illustrated by way of example and not limitation in the Figures of the accompanying drawings in which.

DETAILED DESCRIPTION

Systems and methods for ordering, delivering and licensing wager gaming content are described herein. This description of the embodiments is divided into multiple sections. A first section provides an introduction to embodiments of the invention, while a second section describes an example operating environment and system architecture. A third section describes a network based interface into wager gaming content and an ordering system. A fourth section describes example operations and a fifth section describes some example licensing models that can be used in conjunction with embodiments of the invention. A sixth section provides some general comments.

The functions or algorithms described herein are implemented in software or a combination of software and human implemented procedures in one embodiment. The software comprises computer executable instructions stored on computer readable media such as memory or other type of storage devices. The term "computer readable media" is also used to represent carrier waves on which the software is transmitted. Further, such functions correspond to modules, which are software, hardware, firmware or any combination thereof. Multiple functions are performed in one or more modules as desired, and the embodiments described are merely examples. The software is executed on a digital signal processor, ASIC, microprocessor, or other type of processor operating on a computer system, such as a personal computer, server or other computer system.

Introduction

This section provides an introduction to embodiments of a system for delivering and licensing wager gaming content.

Figure 1:
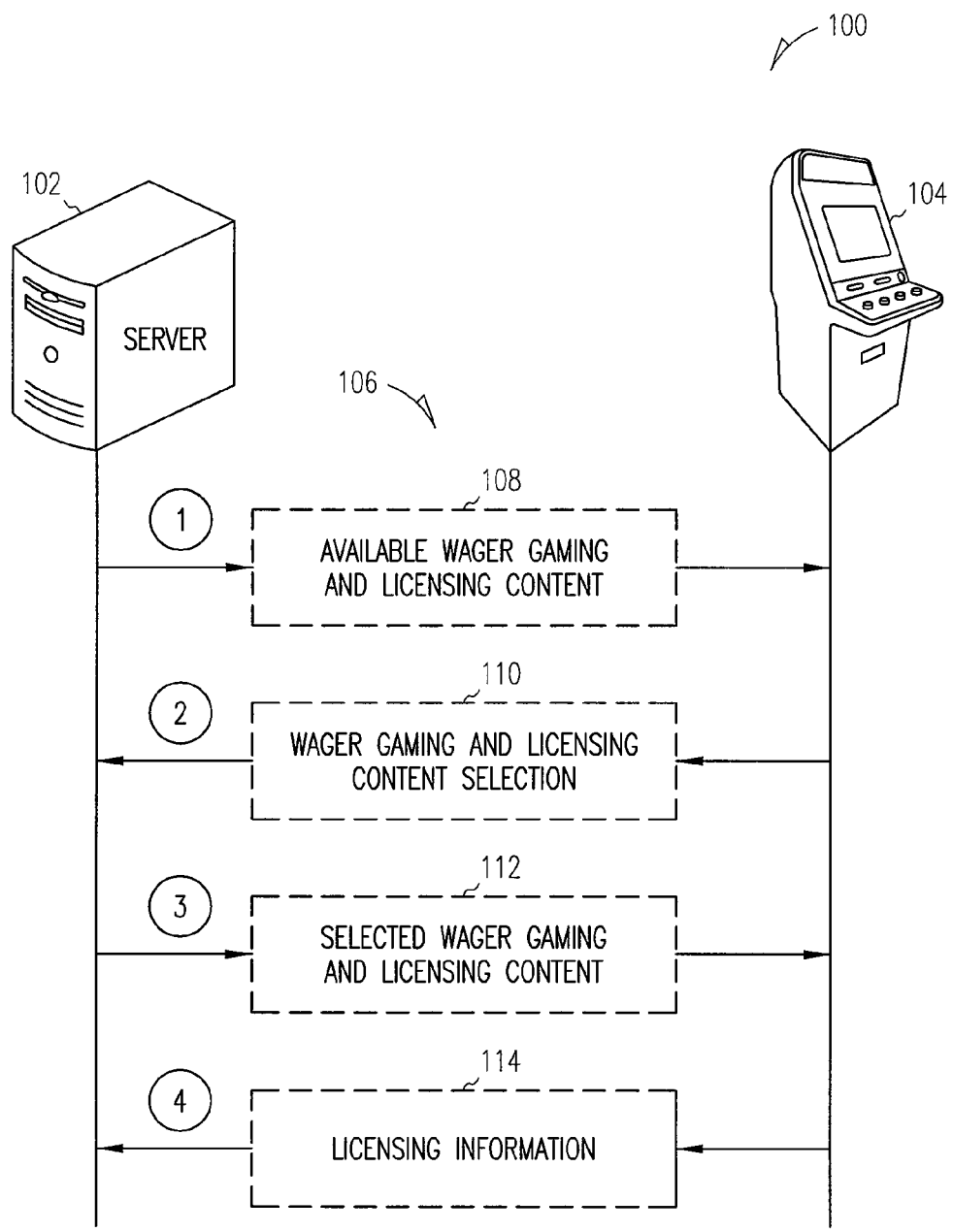
FIG. 1 is a dataflow diagram illustrating data transmissions between a content server and a wager gaming machine according to an example embodiment.

FIG. 1 is a dataflow diagram illustrating data transmissions between a content server and a wager gaming machine. In FIG. 1, the data transmissions occur over a network connection 106 between a content server 102 and a wager gaming machine 104. The content server 102 includes wager gaming and licensing content for electronic distribution to the wager gaming machine 104. In FIG. 1, the data transmissions occur in four stages.

At stage one, the content server 102 transmits a list of available wager gaming and licensing content 108 to the wager gaming machine 104. The wager gaming machine 104 selects some of the available wager gaming and licensing content.

At stage two, the wager gaming machine 104 transmits a wager gaming and licensing content selection 110 to the content server 102.

At stage three, the content server 102 transmits to the wager gaming machine 104 the selected wager gaming and licensing content 112. The wager gaming machine 104 can conduct games (e.g., video black jack, video roulette, video slots, etc.) based on the wager gaming content portion of the selected wager gaming and licensing content. The licensing content portion of the selected wager gaming and licensing content can include instructions and/or data for enforcing a license for using wager gaming content. The licensing content can be used for determining fees based on any suitable licensing model (see the Example Licensing Models section below). For example, the licensing content may determine fees based on how many games are conducted using the wager gaming content, a duration of time in which the wager gaming content is used, or revenue received while using the wager gaming content.

At stage four, the wager gaming machine 104 transmits licensing information to the content server 102. The licensing information includes information for determining licensing fees for using the wager gaming content. For example, the licensing information can include a number of games in which the wager gaming machine 104 used the wager gaming content and/or a duration of time in which the wager gaming machine 104 conducted games based on the wager gaming content. The content server 102 can also use the licensing information for determining whether a license has expired.

Hardware, Operating Environment, and System Architecture

This section provides an example system architecture in which embodiments of the invention can be practiced. This section also describes an example computer system and wager gaming machine. Operations of the system components will be described in the next section.

Example System Architecture

Figure 2:
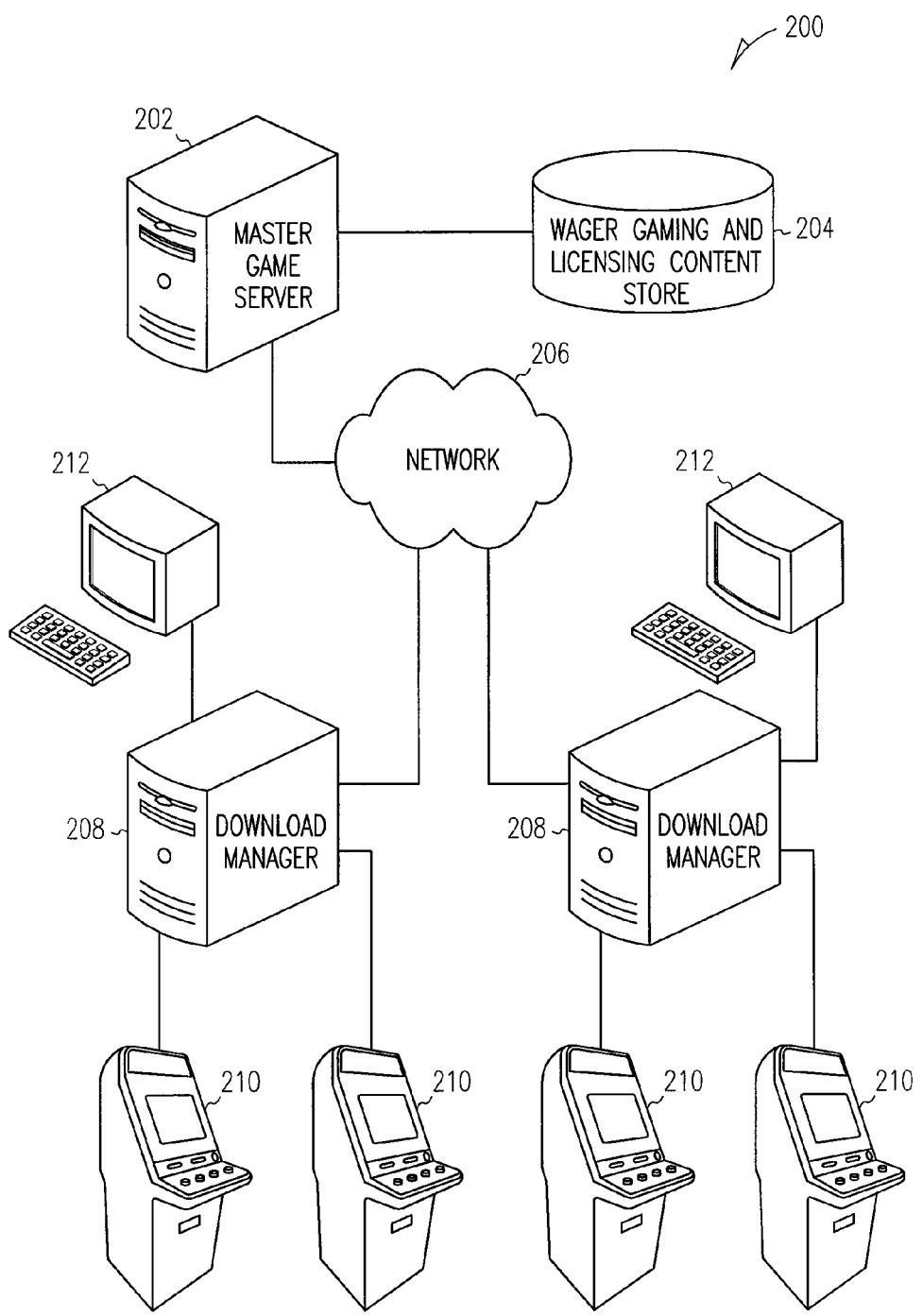
FIG. 2 is a block diagram illustrating a system for delivering and licensing wager gaming content according to an example embodiment.

FIG. 2 is a block diagram illustrating a system for delivering and licensing wager gaming content, according to example embodiments of the invention. As shown in FIG. 2, a system 200 includes a master game server 202 which is connected to wager gaming and licensing content store 204. The master game server 202 is also connected to a network 206, which is connected to a pair of download managers 208. Each download manager 208 is connected to an administrator terminal 212 and pair of wager gaming machines 210.

The wager gaming and licensing content store 204 includes wager gaming content and licensing content. The wager gaming content can include instructions and/or data used for conducting casino style wagering games (e.g., video slots, video poker, video black jack, and the like). In one embodiment, the wager gaming content can include program code, audio content, video content, and/or other data used for conducting all or part of a casino style slots game and/or bonus events.

The licensing content can include data and/or instructions for enforcing a license for using wager gaming content. In one embodiment, the licensing content can be used to enforce any suitable licensing model. Some example licensing models will be described below (see the Example Licensing Models section below).

In one embodiment, the master game server 202 distributes wager gaming and licensing content to the download managers 208. The download managers 208 can manage delivery of the wager gaming and licensing content to the wager gaming machines 210. Additionally, the download managers 208 can process and report licensing information, as described in greater detail below (see System Operations section).

In one embodiment, each wager gaming machine 210 serves as a thin client to a download manager 208 or other computer system. As a thin client, each wager gaming machine 210 includes logic for presenting and receiving gaming information, while logic for conducting games is disposed within the download manager 208 or other computer system (not shown). In another embodiment, the wager gaming machine 210 includes all logic for presenting and receiving gaming information and for conducting a game. The wager gaming machines 210 can be embodied in any suitable computing device, such as a desktop computer, laptop computer, or personal digital assistant.

The components of the system 200 can be connected using any suitable connection technology. For example, the components can be connected via RS-232, Ethernet, 802.11, public switched telephone networks, DSL, or any other connection technology. The network 206 can be a local area network or wide-area network and can transmit licensing and wager gaming content using any suitable communication protocols.

The administrator terminals 212 can be used for configuring and accessing licensing and wager gaming content stored in the download managers 208.

Figure 3:
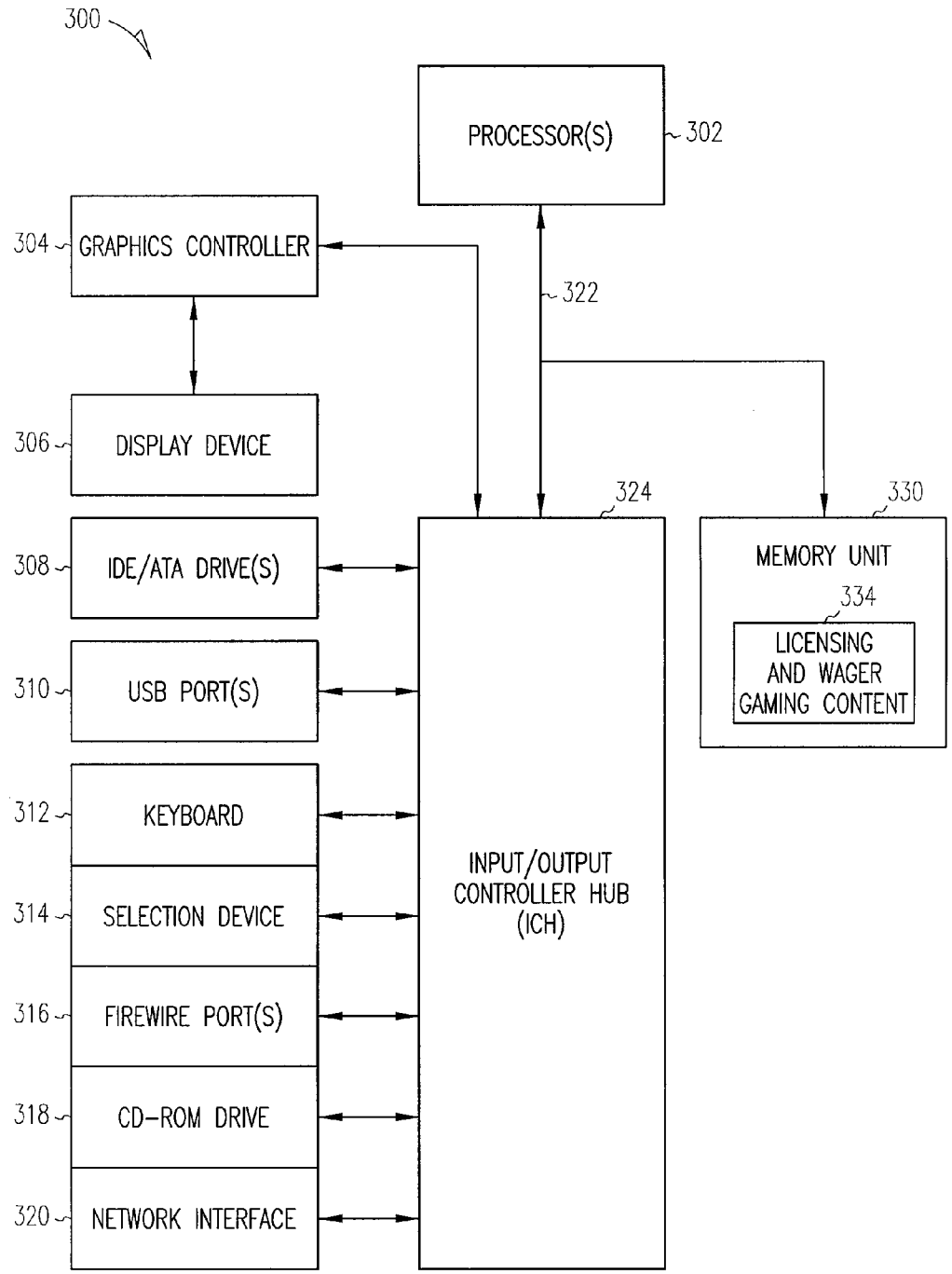
FIG. 3 illustrates an exemplary computer system used in conjunction with certain example embodiments of the invention.
Figure 4:
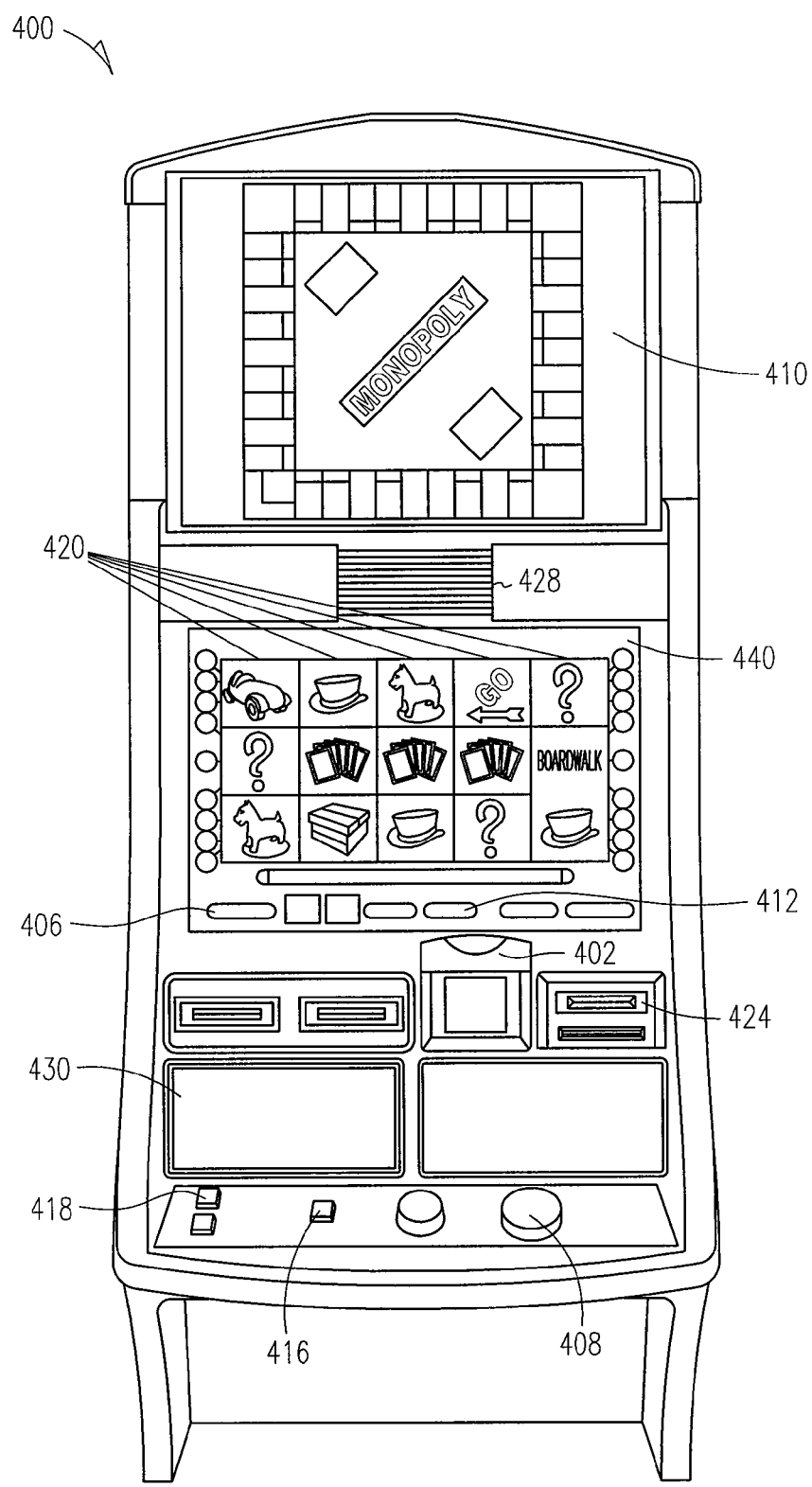
FIG. 4 is a perspective view of a wager gaming machine according to an example embodiment.

While FIG. 2 describes a system for delivering and licensing wager gaming content, FIGS. 3 and 4 describe master game servers, download managers, and wager gaming machines in greater detail. In particular, FIG. 3 describes a computer system suitable for use as a master game server or download manager, whereas FIG. 4 describes embodiments of a wager gaming machine in greater detail.

Example Computer System and Wager Gaming Machine

FIG. 3 illustrates an exemplary computer system used in conjunction with certain embodiments of the invention. As illustrated in FIG. 3, the computer system 300 comprises processor(s) 302. The computer system 300 also includes a memory unit 330, processor bus 322, and Input/Output controller hub (ICH) 324. The processor(s) 302, memory unit 330, and ICH 324 are coupled to the processor bus 322. The processor(s) 302 may comprise any suitable processor architecture. The computer system 300 may comprise one, two, three, or more processors, any of which may execute a set of instructions in accordance with embodiments of the invention.

The memory unit 330 includes licensing and wager gaming content 334. The memory unit 330 can also store data and/or instructions, and may comprise any suitable memory, such as a dynamic random access memory (DRAM). The computer system 300 also includes IDE drive(s) 308 and/or other suitable storage devices. A graphics controller 304 controls the display of information on a display device 306, according to embodiments of the invention.

The input/output controller hub (ICH) 324 provides an interface to I/O devices or peripheral components for the computer system 300. The ICH 324 may comprise any suitable interface controller to provide for any suitable communication link to the processor(s) 302, memory unit 330 and/or to any suitable device or component in communication with the ICH 324. For one embodiment of the invention, the ICH 324 provides suitable arbitration and buffering for each interface.

For one embodiment of the invention, the ICH 324 provides an interface to one or more suitable integrated drive electronics (IDE) drives 308, such as a hard disk drive (HDD) or compact disc read only memory (CD ROM) drive, or to suitable universal serial bus (USB) devices through one or more USB ports 310. For one embodiment, the ICH 324 also provides an interface to a keyboard 312, a selection device 314, a CD-ROM drive 318, one or more suitable devices through one or more firewire ports 316. For one embodiment of the invention, the ICH 324 also provides a network interface 320 though which the computer system 300 can communicate with other computers and/or devices.

In one embodiment, the computer system 300 can be employed as a master game server 202, download manager 208, or administrator console 212. In one embodiment, the computer system 300 includes a machine-readable medium that stores a set of instructions (e.g., software) embodying any one, or all, of the methodologies for distributing and licensing wager gaming content described herein. Furthermore, software can reside, completely or at least partially, within memory unit 330 and/or within the processor(s) 302.

While FIG. 3 describes a computer system that can be used in conjunction with embodiments of the invention, FIG. 4 describes embodiments of a wager gaming machine that can be used with embodiments of the invention.

FIG. 4 is a perspective view of a wager gaming machine, according to exemplary embodiments of the invention. As shown in FIG. 4, the wager gaming machine 400 can be a computerized slot machine having the controls, displays, and features of a conventional slot machine.

The wager gaming machine 400 can be operated while players are standing or seated. Additionally, the wager gaming machine 400 is preferably mounted on a stand (not shown). However, it should be appreciated that the wager gaming machine 400 can be constructed as a pub-style tabletop game (not shown), which a player can operate while sitting. Furthermore, the wager gaming machine 400 can be constructed with varying cabinet and display designs. The wager gaming machine 400 can incorporate any primary game such as slots, poker, or keno, and additional bonus round games. The symbols and indicia used on and in the wager gaming machine 400 can take mechanical, electrical, or video form.

As illustrated in FIG. 4, the wager gaming machine 400 includes a coin slot 402 and bill acceptor 424. Players can place coins in the coin slot 402 and paper money or ticket vouchers in the bill acceptor 424. Other devices can be used for accepting payment. For example, credit/debit card readers/validators can be used for accepting payment. Additionally, the wager gaming machine 400 can perform electronic funds transfers and financial transfers to procure monies from financial accounts. When a player inserts money in the wager gaming machine 400, a number of credits corresponding to the amount deposited are shown in a credit display 406. After depositing the appropriate amount of money, a player can begin playing the game by pushing play button 408. The play button 408 can be any play activator used for starting a wagering game or sequence of events in the wager gaming machine 400.

As shown in FIG. 4, the wager gaming machine 400 also includes a bet display 412 and a "bet one" button 416. The player places a bet by pushing the bet one button 416. The player can increase the bet by one credit each time the player pushes the bet one button 416. When the player pushes the bet one button 416, the number of credits shown in the credit display 406 decreases by one credit, while the number of credits shown in the bet display 412 increases by one credit.

A player may "cash out" by pressing a cash out button 418. When a player cashes out, the wager gaming machine 400 dispenses a voucher or currency corresponding to the number of remaining credits. The wager gaming machine 400 may employ other payout mechanisms such as credit slips (which are redeemable by a cashier) or electronically recordable cards (which track player credits), or electronic funds transfer.

The wager gaming machine also includes a primary display unit 404 and a secondary display unit 410 (also known as a "top box"). The wager gaming machine may also include an auxiliary video display. In one embodiment, the primary display unit 440 displays a plurality of video reels 420. According to embodiments of the invention, the display units 440 and 410 can include any visual representation or exhibition, including moving physical objects (e.g., mechanical reels and wheels), dynamic lighting, and video images. In one embodiment, each reel 420 includes a plurality of symbols such as bells, hearts, fruits, numbers, letters, bars or other images, which correspond to a theme associated with the wager gaming machine 400. Furthermore, as shown in FIG. 4, the wager gaming machine 400 includes a audio presentation unit 428. The audio presentation unit 428 can include audio speakers or other suitable sound projection devices.

In one embodiment, a plurality of wager gaming machines can be connected to a plurality of download managers in a gaming network. In the gaming network, the wager gaming machines can receive licensing and wager gaming content, as described herein. Additionally, the wager gaming machines can conduct casino style wagering games based on the wager gaming content.

System Operations

This section describes operations performed by embodiments of the invention. In certain embodiments, the operations are performed by instructions residing on machine-readable media (e.g., software), while in other embodiments, the methods are performed by hardware or other logic (e.g., digital logic).

In this section, FIGS. 5-10 will be discussed. In particular, FIGS. 5 and 6 describe operations for selecting and distributing licensing and wager gaming content, while FIGS. 7-10 describe operations for conducting games based on the licensing and wager gaming content. This description will proceed with a discussion of FIG. 5.

Figure 5:
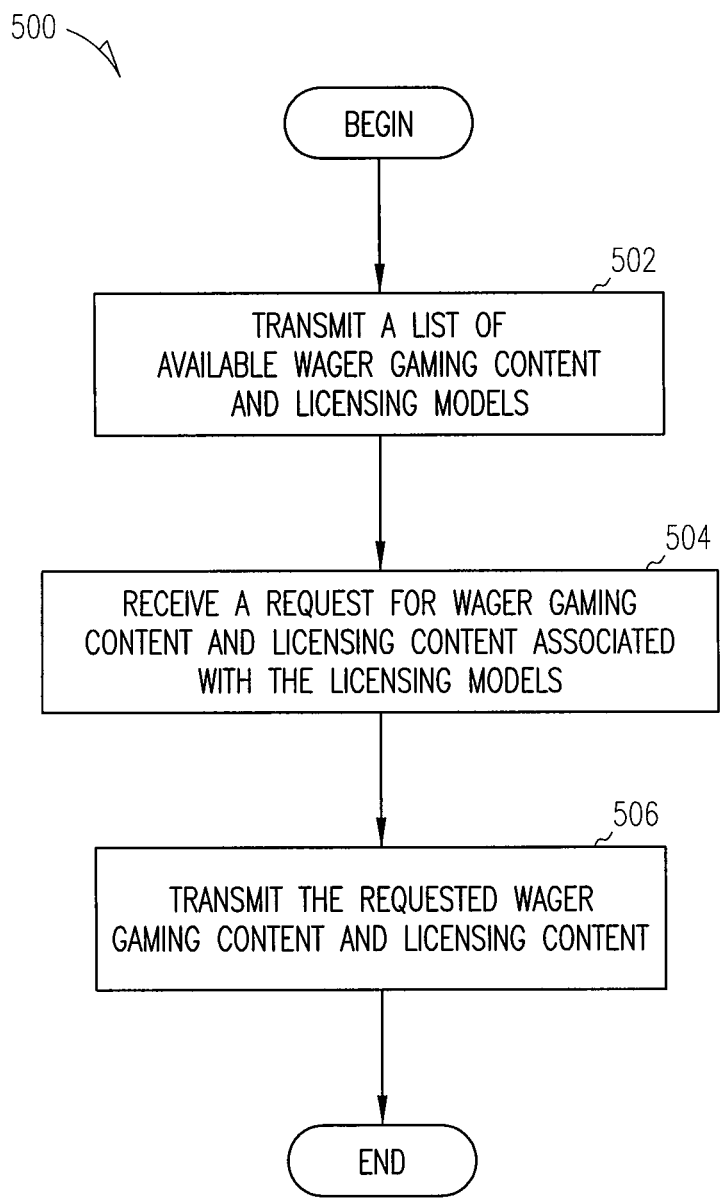
FIG. 5 is a flow diagram illustrating operations for transmitting requested wager gaming and licensing content according to an example embodiment.

FIG. 5 is a flow diagram illustrating operations for transmitting requested wager gaming and licensing content, according to exemplary embodiments of the invention. The flow diagram 500 will be described with reference to the exemplary system shown in FIG. 2. The flow diagram 500 commences at block 502.

At block 502, a list of available wager gaming content and licensing models is transmitted. For example, the master game server 202 transmits a list of available wager gaming content and licensing models to the download manager 208. Some of the available wager gaming content may require special hardware, such as special user-input buttons, display devices, etc. In one embodiment, the list of available wager gaming content includes games which are suitable for the gaming devices that will receive the available wager gaming content list (i.e. the games do not require hardware not present on the gaming devices). The flow continues at block 504.

At block 504, a request for wager gaming content and licensing content associated with a licensing model is received. In one embodiment, the master game server 202 receives this request from the download manager 208. The flow continues at block 506.

At block 506, the requested wager gaming content and licensing content is transmitted. For example, the master game server 202 transmits the requested wager gaming and licensing content to the download manager 208. From block 506, the flow ends.

Figure 6:
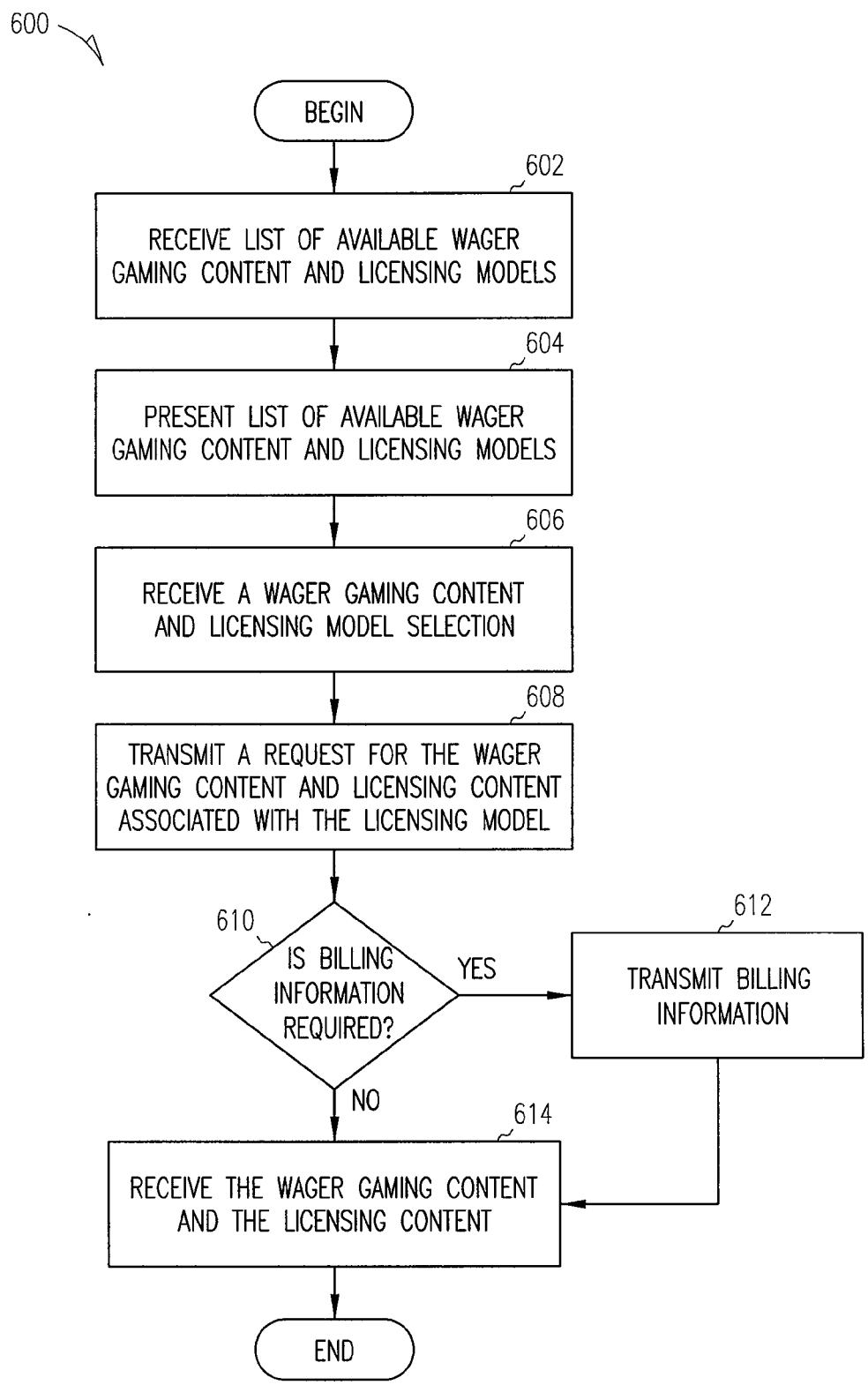
FIG. 6 is a flow diagram illustrating operations for selecting and receiving wager gaming and licensing content according to an example embodiment.

While FIG. 5 describes operations for transmitting selected wager gaming and licensing content, FIG. 6 describes operations for receiving and selecting wager gaming and licensing content.

FIG. 6 is a flow diagram illustrating operations for selecting and receiving wager gaming and licensing content, according to exemplary embodiments of the invention. The flow diagram 600 will be described with reference to the exemplary system shown in FIG. 2. The flow diagram 600 commences at block 602.

At block 602, a list of available wager gaming content and licensing models are received. For example, the download manager 208 receives a list of available wager gaming content and licensing models from the master game server 202. The flow continues at block 604.

At block 604, the list of available wager gaming content and licensing models are presented. For example, download manager 208 presents the list of available wager gaming content and licensing models to a system administrator via the administrator terminal 212. The flow continues at block 606.

At block 606, a wager gaming content and licensing model selection is received. For example, the administrator terminal 212 receives a selection indicating a selected licensing model and selected wager gaming content. In one embodiment, a system administrator makes the selection through a graphical user interface presented on the administrator terminal 212. The flow continues at block 608.

At block 608, a request for the selected wager gaming and licensing content is transmitted. For example, the administrator terminal 212 transmits a request for licensing content associated with the selected licensing model and for the selected wager gaming content. The flow continues at block 610.

At block 610, a determination is made about whether billing information is required. In one embodiment, the download manager 208 makes this determination. If billing information is required, the flow continues at block 612. Otherwise, the flow continues at block 614.

At block 612, billing information is transmitted. For example, the download manager 208 a transmits billing information to the master game server 202. In one embodiment, billing information can include a billing address, credit card information, billing account information, or any other information that can be used for paying/collecting fees for using the selected wager gaming content. From block 612, the flow continues at block 614.

At block 614, the selected wager gaming and licensing content is received. For example, the download manager 208 receives the selected wager gaming and licensing content from the master game server 202. From block 614, the flow ends.

The discussion of FIGS. 5 and 6 above described operations for transmitting and receiving licensing and wager gaming content through a system. In the discussion below, FIGS. 7-10 describe operations for conducting games using the selected wager gaming and licensing content. In particular, FIGS. 7 and 8 describe embodiments in which operations for processing licensing content are performed by download managers, whereas FIGS. 9 and 10 describe embodiments in which licensing content is processed by wager gaming machines.

Figure 7:
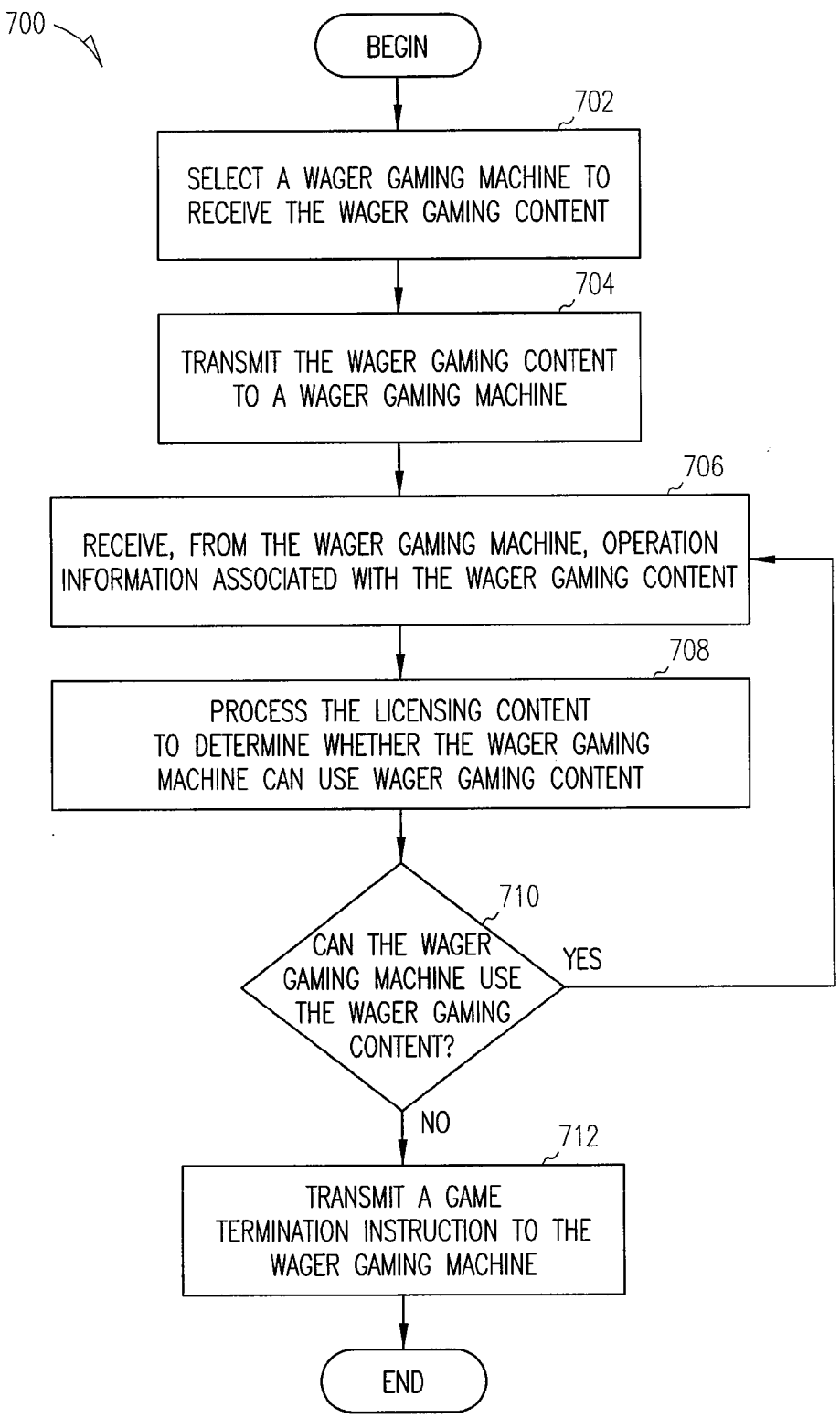
FIG. 7 is a flow diagram illustrating operations for distributing wager gaming content to a wager gaming machine and enforcing a license for using the wager gaming content according to an example embodiment.

FIG. 7 is a flow diagram illustrating operations for distributing wager gaming content to a wager gaming machine and enforcing a license for using the wager gaming content, according to exemplary embodiments of the invention. The operations of the flow diagram 700 will be described with reference to the exemplary system of FIG. 2. The flow diagram 700 commences at block 702.

At block 702, a wager gaming machine is selected. For example, the download manager 208 selects one of the wager gaming machines 210. The flow continues at block 704.

At block 704, wager gaming and licensing content is transmitted to the wager gaming machine. For example, the download manager 208 transmits wager gaming and licensing content to the selected wager gaming machine 210. In one embodiment, the wager gaming machine 210 has to "activate" the wager gaming content with a separate hardware or software key. In one embodiment, the key can reside on a device that is physically coupled to the wager gaming machine 210. In another embodiment, the key can be transmitted to the wager gaming machine 210 over a network connection. The flow continues at block 706.

At block 706, wager gaming content use information associated with the wager gaming content is received from the wager gaming machine. In one embodiment, the download manager 208 receives this information. In one embodiment, the wager gaming content use information can include a number of games in which the wager gaming content was used, a duration of time in which the wager gaming content has been in use on the wager gaming machine 210, an amount of money received from conducting games based on the wager gaming content, or any other information about how the wager gaming content has been used. The flow continues at block 708.

At block 708, licensing content is processed to determine whether the wager gaming machine can use the wager gaming content. For example, the download manager 208 processes licensing content to determine whether the wager gaming machine 210 can conduct games based on the wager gaming content and to determine licensing fees for use of the wager gaming content. In one embodiment, the download manager 208 received the licensing content as a result of performing the flow 600.

In one embodiment, the download manager 208 compares the wager gaming content use information to licensing information. For example the download manager 208 compares the number of games played on the wager gaming machine 210 to a number of games for which a customer has paid. The download manager 208 can also compare the duration for which the wager gaming content has been on the wager gaming machine 210 to a duration for which the customer has paid. The download manager 208 can process the information to determine licensing fees according to any suitable licensing model (see Licensing Models section below).

The flow continues at block 710.

At block 710, a determination is made about whether the wager gaming machine can use the wager gaming content. If the wager gaming machine can use the wager gaming content, the flow continues at block 706. Otherwise, the flow continues at block 712.

At block 712, a game termination instruction is transmitted to the wager gaming machine. For example, the download manager 208 transmits a game termination instruction to the wager gaming machine 210. From block 712, the flow ends.

Figure 8:
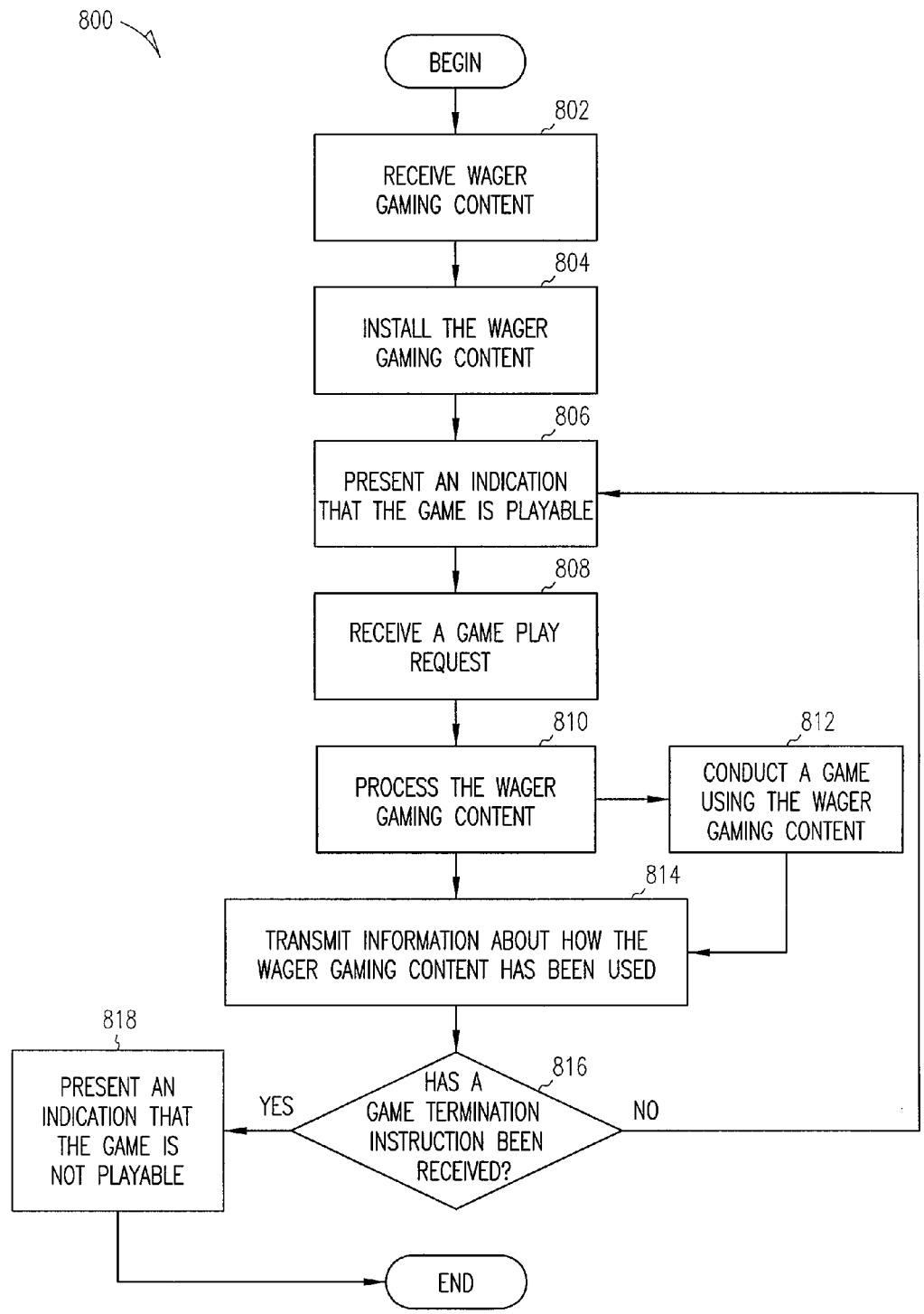
FIG. 8 is a block diagram illustrating conducting games based on wager gaming content received over a network connection according to an example embodiment.

While FIG. 7 describes distributing wager gaming content to a wager gaming machine and enforcing a license for using the wager gaming content, FIG. 8 describes operations for conducting games based on the wager gaming content.

FIG. 8 is a block diagram illustrating operations for conducting games based on wager gaming content, according to exemplary embodiments of the invention. The flow diagram 800 will be described with reference to exemplary embodiments shown in FIG. 2. The flow diagram 800 commences at block 802.

At block 802, wager gaming content is received. For example, a wager gaming machine 210 receives wager gaming content from the download manager 208. In another embodiment, the wager gaming content is hand delivered by a system technician. The flow continues at block 804.

At block 804, the wager gaming content is installed. For example, the wager gaming machine 210 installs the wager gaming content into existing game logic. In one embodiment, installation includes configuring existing game logic (e.g., hardware and/or software) to use the wager gaming content. The flow continues at block 806.

At block 806, the wager gaming machine indicates the game is playable. For example, a wager gaming machine 210 presents audio and/or video for attracting casino players to the game. The flow continues at block 808.

At block 808, a game-play request is received. For example, the wager gaming machine 210 receives a request to play the game. In one embodiment, the request is received from a casino player. The flow continues at block 810.

At block 810, the wager gaming content is processed. For example, in preparation for conducting a game, the wager gaming machine 210 extracts audio content, video content, and/or data from the wager gaming content. The flow continues at block 812.

At block 812, a game is conducted using the wager gaming content. For example, the wager gaming machine 210 conducts a game based on the wager gaming content. In one embodiment, the game can be any casino style wagering game, such as video blackjack, video poker, video slots, etc. The flow continues at block 814.

At block 814, information about how the wager gaming content has been used is transmitted. For example, the wager gaming machine 210 transmits to the download manager 208 information indicating how the wager gaming content has been used. Wager gaming content use information can include a number of games conducted based on the wager gaming content, a length of time the wager gaming machine 210 used the wager gaming content, or any other information related to how the wager gaming content has been used. The flow continues at block 816.

At block 816, a determination is made about whether a game termination instruction has been received. In one embodiment, the wager gaming machine 210 makes this determination. If a game termination instruction has been received, the flow continues at block 818. Otherwise, the flow continues at block 806.

At block 818, an indication that the game is not playable is presented. For example, the wager gaming machine 210 indicates that the game is not playable by turning-off its primary display unit. From block 818, the flow ends.

Figure 9:
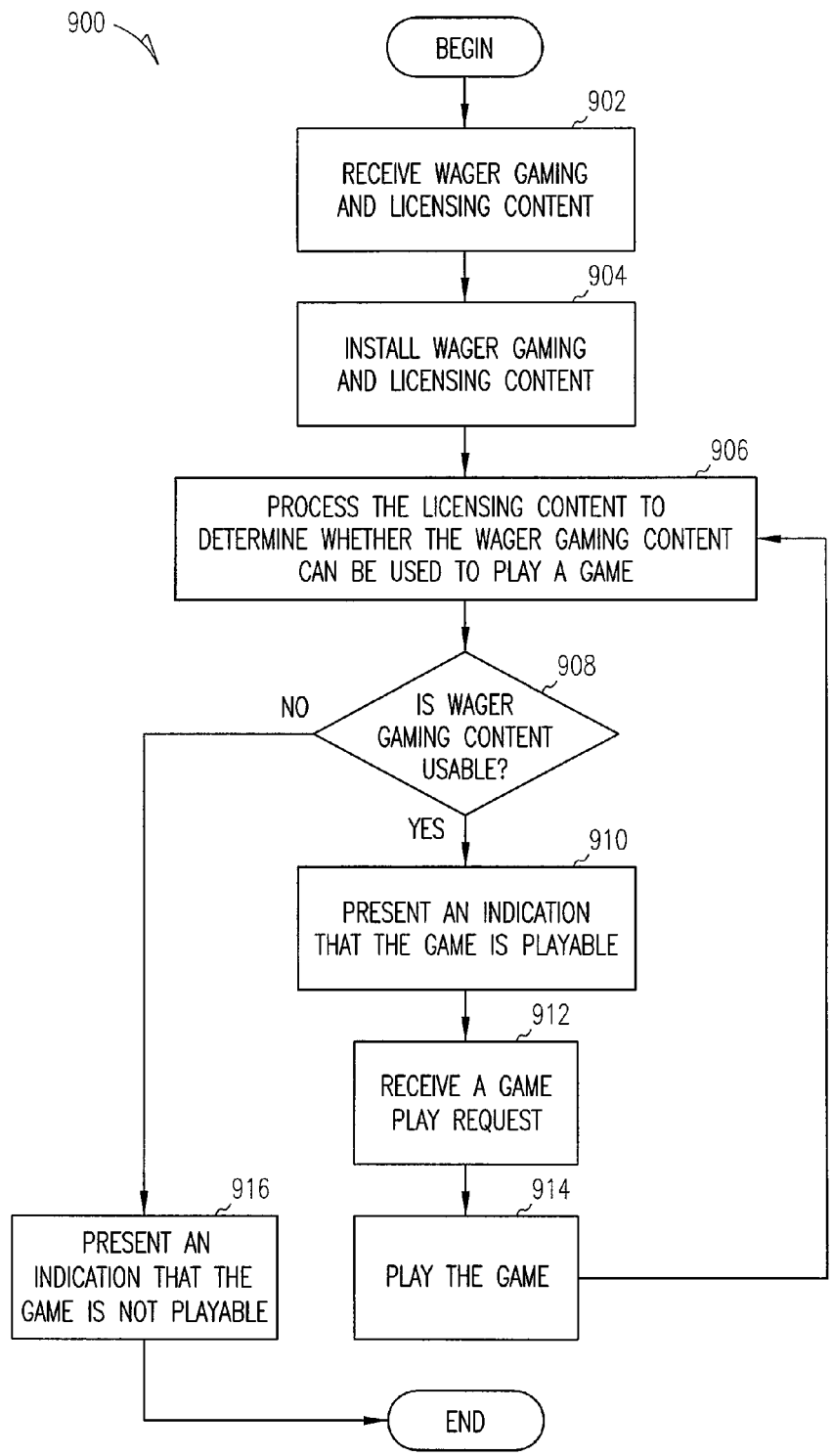
FIG. 9 is a flow diagram illustrating conducting games based on wager gaming content received over a network connection, according to an example embodiment.
Figure 10:
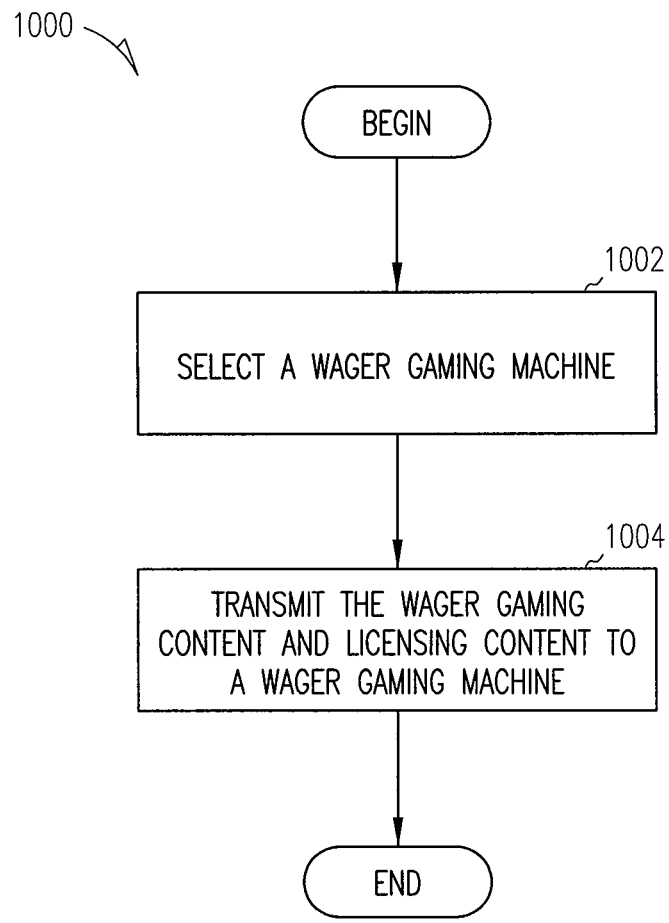
FIG. 10 is a flow diagram illustrating operations for translating wager gaming and licensing content to a wager gaming machine according to an example embodiment.

While FIGS. 7 and 8 describe embodiments in which operations for processing licensing content are performed by download managers, FIGS. 9 and 10 describe embodiments in which licensing content is processed by the wager gaming machines. This continues with a discussion of FIG. 9.

FIG. 9 is a flow diagram illustrating operations for conducting games based on wager gaming content received over a network connection, according to exemplary embodiments of the invention. The flow diagram 900 will be described with reference to exemplary embodiments shown in FIG. 2. The flow diagram 900 commences at block 902.

At block 902, wager gaming and licensing content are received. For example, a wager gaming machine 210 receives wager gaming and licensing content from a download manager 208. The flow continues at block 904.

At block 904, the wager gaming and licensing content are installed. For example, the wager gaming machine 210 installs the wager gaming and licensing content into existing game logic. In one embodiment, installation includes configuring existing game and licensing logic (e.g., hardware and/or software) to use the wager gaming and licensing content. The flow continues at block 906.

At block 906, the licensing content is processed for determining whether the wager gaming content can be used to play game. For example, the wager gaming machine 210 processes licensing content to determine whether it can conduct games based on the wager gaming content. The flow continues at block 908.

At block 908, a determination is made about whether the wager gaming machine can conduct a game based on the wager gaming content. If the wager gaming machine can conduct a game based on the wager gaming content, the flow continues at block 910. Otherwise, the flow continues at block 916.

At block 910, the wager gaming machine indicates the game is playable. For example, the wager gaming machine 210 presents audio and/or video for attracting casino players to the game. The flow continues at block 912.

At block 912, a game-play request is received. For example, the wager gaming machine 210 receives a request to play the game. In one embodiment, the request is received as a result of a casino player actuating one or more buttons on the wager gaming machine 210. A flow continues at block 914.

At block 914, a game is conducted using the wager gaming content. For example, the wager gaming machine 210 conducts a game based on the wager gaming content. In one embodiment, the game can be any casino style wagering game, such as video blackjack, video poker, video slots, etc. The flow continues at block 906.

At block 916, an indication that the game is not playable is presented. For example, the wager gaming machine 210 indicates that the game is not playable by turning-off its primary display unit. In one embodiment, after presenting the indication, the wager gaming machine 210 notifies the download manager 208 that the wager gaming content is not usable. From block 916, the flow ends.

FIG. 10 is a flow diagram illustrating operations for distributing wager gaming and licensing content to a wager gaming machine. In one embodiment, the wager gaming machine will perform operations for enforcing a wager gaming content license. The operations of FIG. 10 will be described with reference to the embodiments shown in FIG. 2. The flow 1000 commences at block 1002.

At block 1002, a wager gaming machine is selected. For example, the download manager 208 selects a wager gaming machine 210. In one embodiment, a system administrator selects a wager gaming machine 210 via the administrator terminal 212. The flow continues at block 1004.

At block 1004, wager gaming content and licensing content is transmitted to the selected wager gaming machine. For example, the download manager 208 transmits wager gaming and licensing content to the selected getting machine 210. In one embodiment, the wager gaming machine 210 uses the licensing content to enforce a license for using the wager gaming content. From block 1004, the flow ends.

Network Based Interface into Wager Gaming Content and an Ordering System

Figure 11:
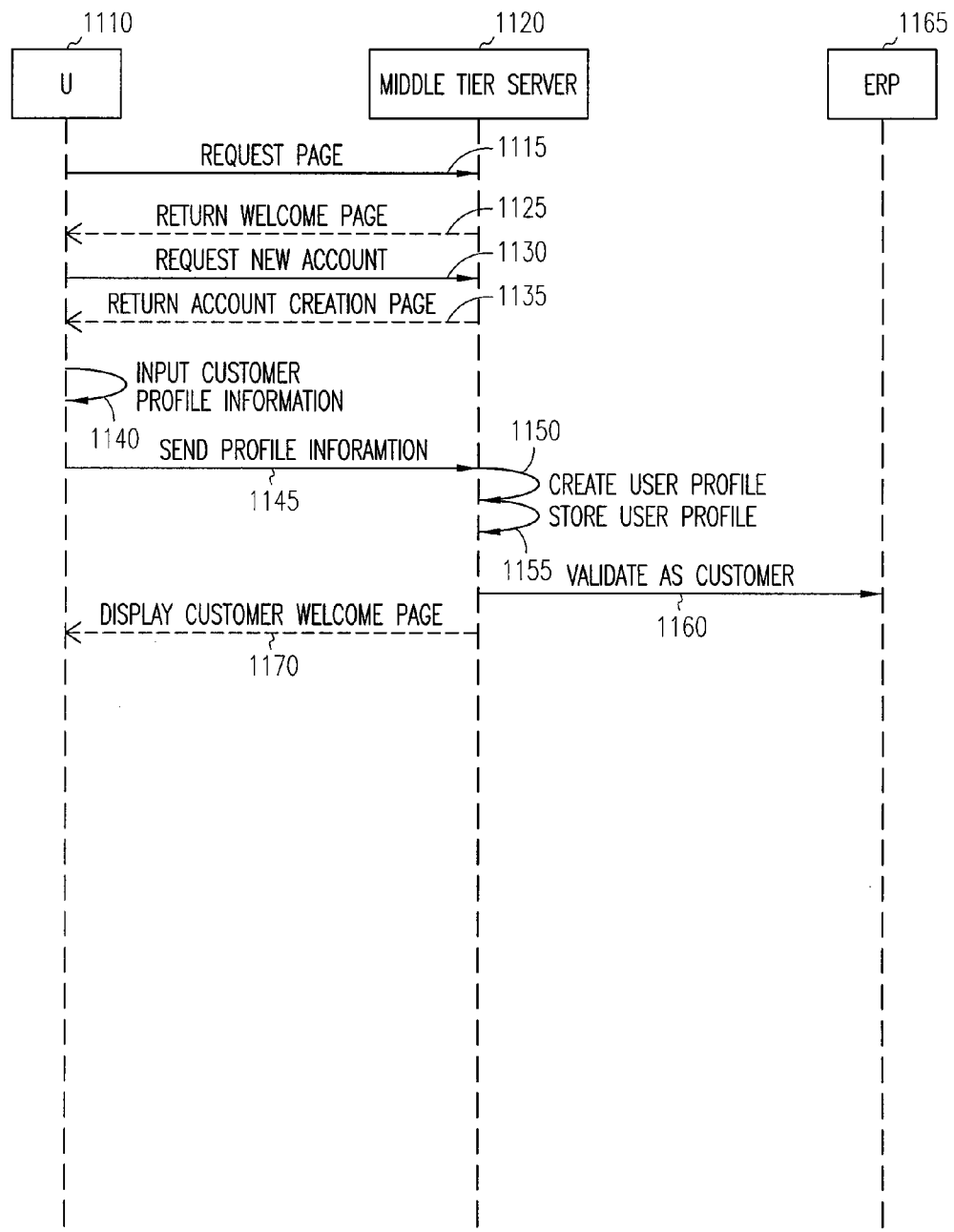
FIG. 11 is a sequence diagram illustrating wager gaming content purchasing account creation according to an example embodiment.

FIG. 11 is sequence diagram of setting up an account for selecting wager gaming content. A user 1110 uses an internet appliance, such as a personal computer having an Internet or other type of network connection to request a provider page at 1115. In one embodiment, the provider page is a web based page of a wager gaming content provider, such as the current assignee of the present application. The page may be provided by a middle tier server 1120, or other server utilized by the provider to provide a web based interface to the user 1110. The middle tier server 1120 may be provided by an Internet service provider, or may be provided directly by the wager gaming content provider. While the term "Internet" is used herein, it is understood that other networks that are capable of transferring data may also be used.

In one embodiment, server 1120 provides a welcome page, or other form of introductory information to the user 1110, that allows the user to request a new account at 1130, such as by clicking on a link. A return account creation page is provided to the user at 1135. The user inputs customer profile information at 1140, and sends the profile information back to the server 1120 at 1145. In further embodiments, the user provides a customer number or some other identifier and the server 1120 may use stored information about the customer to obtain the profile information.

Server 1120 then creates a user profile at 1150 and stores profile data at 1155. Server 1120 may then send information to an enterprise resource planning system (ERP) 1165 to validate the user as a customer of the wager gaming content provider. ERP 1165 comprises an order entry system in one embodiment, but may also comprise a back end business management system. Server 1120 may then provide a customer welcome page at 1170 for display to the user 1110.

Figure 12:
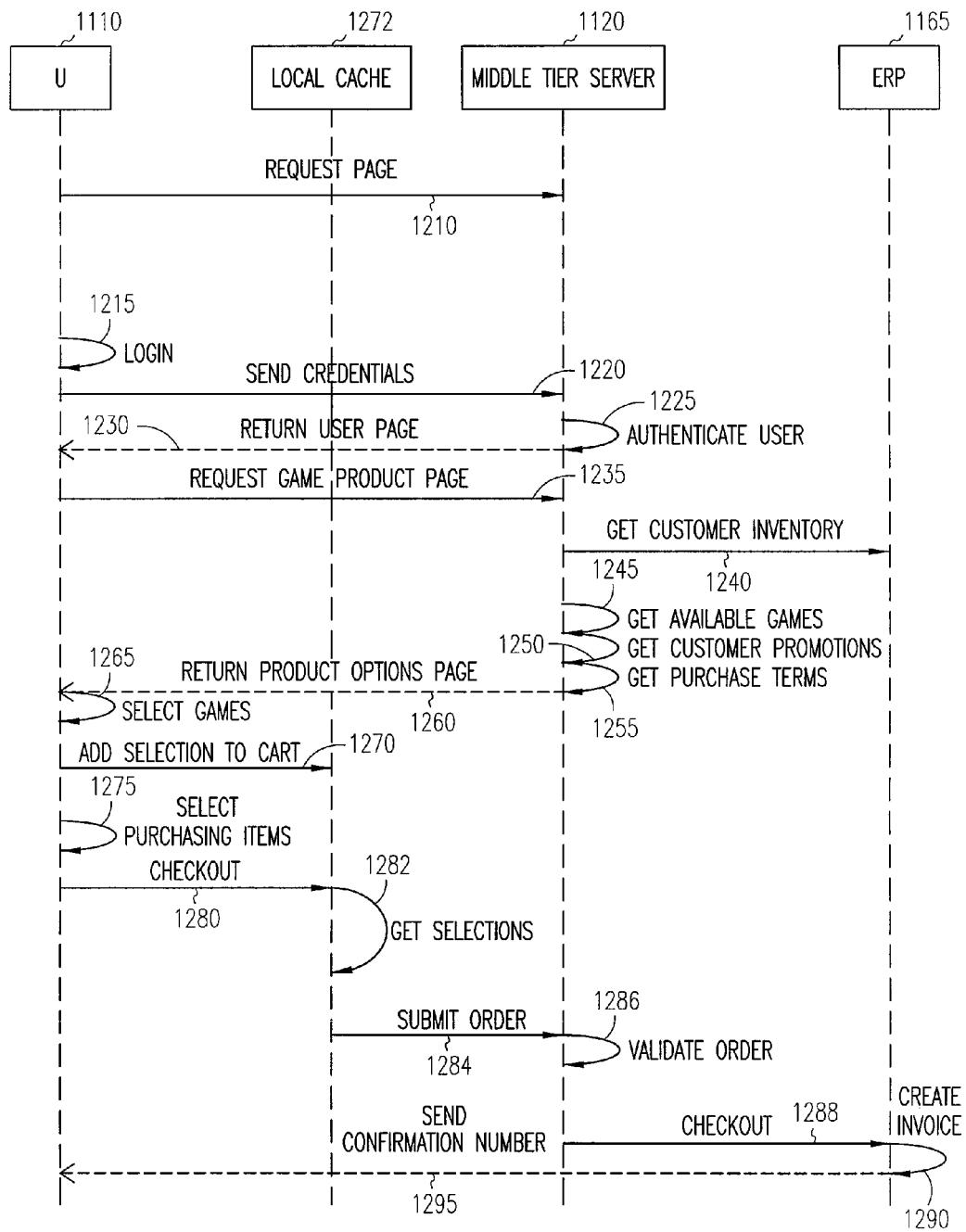
FIG. 12 is a sequence diagram illustrating logging in to a purchasing service, and order wager gaming content according to an example embodiment.

Following account creation, a user may log into an ordering service as indicated in FIG. 12. User 1110 requests the provider home page or other predetermined page at 1210. The user may then log into the service at 1215, by entering credentials, and then sending the credentials at 1220. The server 1120 receives the credentials and authenticates the user at 1225, such as by comparing the credentials to information in a customer database. A user page may be returned at 1230, which may include user customized information, such as the user name and content type preferences, which may be specified by the user. The user may then request a game product page at 1235. The server 1120 may then connect with ERP 1165 to request a list of customer inventory, where the user is a current customer of the wager gaming content provider. Server 1120 may also perform other functions, such as getting a list of available games at 1245, getting customer promotions at 1250 and getting purchase terms at 1255. These functions may utilize information stored at the server 1120, or may obtain such information from other sources, such as ERP 1165 in further embodiments.

A product options page is then created by server 1120 and provided to the user 1110 at 1260. The product options page is created as a function of the customer inventory, available games, customer promotions and purchase terms in one embodiment. The user may select wager gaming content at 1265 for inclusion in a selection cart at 1270, which may be cached in local cache 1272 for convenience. Terms of purchase may then be selected by the user/customer at 1275, whereupon the user may select to check out of the purchasing service at 1280. Local cache 1272 then obtains the selections at 1282, and submits an order at 1284 to the server 1120. The server 1120 validates the order at 1286 and sends the order at 1288 to the ERP 1165. An invoice is created at 1290 by the ERP, along with a confirmation number, which is passed back through to the user at 1295. The invoice may also be created at a later time.

An e-commerce type interface is described in the sequences shown in FIGS. 11 and 12. It allows users to purchase licenses to use provider games on their casino slot floor from any convenient location where connection to an appropriate network is available. In one example embodiment, the interface is implemented as a web-based interface using an internet browser, referred to as a thin client, allowing the targeting of a larger customer base. A slot manager or casino personnel may use this interface to log in, view available games, and add selected games to a shopping cart for purchase. Various game type purchases are supported, such as on-time fees or subscription based purchase. The e-commerce type interface interfaces with the content provider order-entry system to initiate an order process. The order-entry system may then interface with a downloadable code system to initiate corresponding code downloads to make the selected content available to a casino customer.

In further embodiments, billing functions are provided by the order-entry system, making the e-commerce type interface simpler to implement. Notifications of purchases may be provided to content provider employees. Interfacing to code download systems facilitates the initiation of game downloads and terminations. The authentication process ensures that game purchases are limited to valid customers. The e-commerce type interface allows customers to view games purchased and/or view assignment of game themes to existing game devices. Support for promotional purchases may also be provided, such as for example, purchase two games, and get a third for three months. The e-commerce type interface also allows the ability to support a variety of pricing packages, such as subscription-based pricing charged over regular intervals or licensed-based pricing with one-time payments.

Example Licensing Models

This section describes some example licensing models. While this section describes some example implementation details, other embodiments of the invention can be implemented differently. Any of the embodiments described above can determine licensing fees according to any of the following licensing models.

The Tiered Model

In the tiered model, wager gaming content can be ranked in tiers. Tiers which include extremely popular wager gaming content command high licensing fees, while less popular wager gaming content commands lesser licensing fees. In one embodiment, the top 10 most popular games command the highest licensing fees, while less popular games command lesser fees.

The Subscription Model

According to the subscription model, a customer pays a flat licensing fee to use wager gaming content for conducting an unlimited number of games. The customer can pay additional fees for receive "premium" wager gaming content. Like an operator, the player (user) can pay a subscription fee to add features and functionality to a gaming device or network service.

Several other features may be available for a subscription fee. In one embodiment, the player may be guaranteed a highest percentage payback available. Currently, paybacks may be set by a casino, and this feature would allow the play to be ensured that they are playing with the highest percentage playback. A subscription fee may also entitle the player access to a certain library of games. The player may be provided a menu of favorite games that can then be played on any machine. A further feature provides extra bonus features for a subscriber fee. Examples might include the ability to bet less for higher bonuses, where such bonuses may only be available to non-subscribers with higher bets. This may be referred to as a discounted rate bonuses. A still further feature for a subscriber may provide the availability of additional bonuses. Such bonuses might include for example, extra picks in a bonus round, or extra spins in a bonus round. Other bonuses may also be included.

The Periodic Model

According to the periodic model, a wager gaming machine operator can purchase a license in which wager gaming content will be periodically updated and/or replaced with new wager gaming content. For example, wager gaming machines can receive new content every month.

Popularity Model

According to the popularity model, a wager gaming machine operator can purchase a license to conduct several different games on specific wager gaming machines. After determining which of the games are most popular, the license allows the game operator to use the most popular wager gaming content on other wager gaming machines. In one embodiment, a download manager 208 or the master game server 202 transmits the most popular wager gaming content to the wager gaming machines 210 (see discussion of block 702). Popularity can be determined based on games played, coins collected, minutes played, or any suitable criteria.

Player Selection Model

According to the player selection model, wager gaming machines can be configured for allowing players to choose between several different games. Although numerous games are available for players, gaming operators only pay for games selected by players. In one embodiment, there can be a maximum number of machines that can offer a particular game during a given time.

Base-Plus-Premium Model

In the base-plus-premium model, a gaming operator pays a "base" licensing fee for access to a set of wager gaming content. The gaming operator can pay for additional fees for access to "premium" wager gaming content (e.g., very popular wager gaming content).

Feature-based Model

According to the features-based model, gaming operators pay additional licensing fees for additional gaming features. For example, gaming operators can purchase additional game features, such as game state persistence and group-play games. In one embodiment, gaming operators can purchase a "Can't Lose" feature. The "Can't Lose" feature can be implemented as a button which when pressed causes the wager gaming machine to produce a winning result. Before the Can't Lose Button becomes available, the player may have to win a number of credits or perform specific game maneuvers.

Bundled Model

In the bundled model, gaming operators purchase a bundle of wager gaming content for use on a specified number of wager gaming machines. The bundle can include some very popular games and some less popular games. In one embodiment, the gaming operator can use any of the content on any of the specified number of wager gaming machines. Although the gaming operator may not use some of the wager gaming content, the operator pays for all the content.

In addition to the licensing models noted above, embodiments can use any other suitable licensing model. For any licensing model, licensing fees can be determined based various criteria. For example licensing fees can be determined based on:

Length of time wager gaming content resides on a wager gaming machine

Length of time the wager gaming content was used for playing games, excluding idle time Number of games in which the wager gaming content was used Number of coins received for games in which the wager gaming content was used In some embodiments, licensing fees increase as the number of games played increases. For example, the first 1000 games (or minutes of game play) may cost $0.05 per game, while the second 1000 games (or minutes of game play) cost $0.10 per game and the third 1000 games (or minutes of game play) cost $0.20 per game. Alternatively, in another embodiment, licensing fees can decrease as the number of games increases. In one embodiment, licensing fees can be determined by mixing time and game factors. For example, after playing 1000 games at $0.10 per game, the wager gaming content costs $0.10 per minute of game play.

In one embodiment, a licensing plan can call for a given number of game play minutes in a month. If the licensee does not use the licensed wager gaming content for the given number of minutes, the licensee can "roll-over" the minutes to another month. That is, the licensee can use unused game play minutes in another month without incurring additional licensing fees.

These and other criteria can be used with licensing models to determine licensing fees in a system for distributing and licensing wager gaming content.

General

In this description, numerous specific details are set forth. However, it is understood that embodiments of the invention may be practiced without these specific details. In other instances, well-known circuits, structures and techniques have not been shown in detail in order not to obscure the understanding of this description. Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein. Each claim, as may be amended, constitutes an embodiment of the invention, incorporated by reference into the detailed description. Moreover, in this description, the phrase "exemplary embodiment" means that the embodiment being referred to serves as an example or illustration.

Block diagrams illustrate exemplary embodiments of the invention. Flow diagrams illustrate operations of the exemplary embodiments of the invention. The operations of the flow diagrams are described with reference to the example embodiments shown in the block diagrams. However, it should be understood that the operations of the flow diagrams could be performed by embodiments of the invention other than those discussed with reference to the block diagrams, and embodiments discussed with references to the block diagrams could perform operations different than those discussed with reference to the flow diagrams. Additionally, some embodiments may not perform all the operations shown in a flow diagram. Moreover, it should be understood that although the flow diagrams depict serial operations, certain embodiments could perform certain of those operations in parallel.

The invention claimed is:

1. A computer-implemented method of licensing and downloading wagering games from a remote wagering game store via accessing a local download manager connected to the wagering game store by a communications network, the method implemented in a gaming system having one or more processors and one or more memory devices, the method comprising:
    determining, via at least one of the one or more processors, a list of stored wagering games available to an administrative user and the licensing models associated with the available wagering games;
    displaying, on a thin client interface connected to the local download manager, the list to the administrative user;
    receiving, from the administrative user via the thin client interface, a wagering game content order including a selection of an available wagering game associated with a first and a second licensing model and a selection of either the first or the second licensing model, wherein the first licensing model calculates licensing fees for the wagering game in a different way than the second licensing model;
    transmitting, via at least one of the one or more processors, the wagering game content order to the remote wagering game store via the communications network;
    in response to receiving the wagering game content order at the remote wagering game store, transmitting, via at least one of the one or more processors and to the local download manager, executable wagering game code needed to execute and present the ordered wagering game according to the selected licensing model; and
    locally executing, via at least one of the one or more processors, the executable wagering game code corresponding to the ordered wagering game and presenting the ordered wagering game in accordance with the selected licensing model on one or more local gaming machines connected to the local download manager.

2. The method of claim 1, wherein the one or more local gaming machines operate as thin clients of the local download manager while presenting the ordered wagering game.

3. The method of claim 1, wherein the one or more local gaming machine execute the executable wagering game code corresponding to the ordered wagering game while presenting the ordered wagering game.

4. The method of claim 1, wherein the list of available wagering games is based, at least in part, on the one or more local gaming machines.

5. The method of claim 1, further comprising:
    authorizing, via at least one of the one or more processors, the administrative user to communicate with the remote wagering game store; and
    receiving an initial request, via the thin client interface, from the administrative user for the list of available wagering games.

6. The method of claim 5, wherein authorizing the administrative user includes receiving user credentials from the administrative user and accessing a customer account corresponding to the received user credentials.

7. The method of claim 1, wherein the first and second licensing models are selected from a group consisting of a subscription model, a periodic model, a popularity model, a player selection model, a base-plus-premium model, a feature-based model, and a bundled model.

8. The method of claim 1, further comprising, in response to receiving the wagering game content order at the remote wagering game store, transmitting, to the local download manager via the communications network, at least one of audio content and video content for use in presenting the ordered wagering game.

9. A network-connected gaming system configured to download executable wagering game code from a remote wagering store for execution and presentation of a wagering game via one or more local devices, the gaming system comprising:
    a local download manager connected to the remote wagering game store, via a communications network;
    a thin client interface connected to the local download manager and configured to enable an administrative user to access the wagering game store;
    one or more local gaming machines configured to present a wagering game to a player;
    one or more processors; and
    one or more memory devices storing instructions that, when executed by at least one of the one or more processors, cause the gaming system to:
        determine a list of stored wagering games available to the administrative user and licensing models associated with the available wagering games;
        display, on the thin client interface, the list to the administrative user;
        receive, at the remote wagering game store via the communications network, a wagering game content order from the administrative user including a selection of at least one available wagering game associated with a plurality of licensing models and a selection of at least one licensing model of the plurality, wherein each licensing model of the plurality, determines licensing fees according to a different set of criteria:
        in response to receiving the wagering game content order, transmitting, to the local download manager via the communications network, executable wagering game code needed to execute and present the at least one ordered wagering game according to the at least one selected licensing model; and
        locally executing, via at least one or the one or more processors, the executable wagering game code corresponding to the at least one ordered wagering game and presenting the at least one ordered wagering game in accordance with the at least one selected licensing model on at least one of the one or more local gaming machines.

10. The gaming system of claim 9, wherein the one or more local gaming machines operate as thin clients of the local download manager while presenting the ordered wagering game.

11. The gaming system of claim 9, wherein the one or more local gaming machines execute the executable wagering game code corresponding to the ordered wagering game while presenting the ordered wagering game.

12. The gaming system of claim 11, wherein the one or more local gaming machines activate, via an activation key, the executable wagering game code prior to executing the wagering game code.

13. The gaming system of claim 11, wherein the instructions further cause the gaming system to transmit, from the local download manager, an activation key to the one or more local gaming machines, and wherein the one or more local gaming machines activate, via the activation key, the executable wagering game code prior to executing the wagering game code.

14. The gaming system of claim 9, wherein the list of available wagering games is based, at least in part, on hardware configurations of the one or more local gaming machines.

15. The gaming system of claim 9, wherein the plurality of licensing models includes at least two licensing models selected from a group consisting of a subscription model, a periodic model, a popularity model, a player selection model, a base-plus-premium model, a feature-based model, and a bundled model.

16. A computer-implemented method of licensing and downloading wagering games from a remote wagering game store via accessing a local download manager connected to the wagering game store by a communications network, the method implemented in a gaming system having one or more processors and one or more memory devices, the method comprising:
receiving, from an administrative user via a thin client interface connected to the local download manager, a request for wagering games available to the administrative user from the remote wagering game store;
determining, via at least one of the one or more processors, a list of stored wagering games available to the administrative user and the licensing models associated with the available wagering games;
displaying, on the thin client interface, the list to the administrative user;
receiving, at the remote wagering game store via the communications network, a wagering game content order from the administrative user including a selection of at least one available wagering game associated with a plurality of licensing models and selection of a licensing model of the plurality, wherein each licensing model of the plurality determines licensing fees according to a different set of criteria;
in response to receiving the wagering game content order, transmitting, to the local download manager via the communications network, executable wagering game code needed to execute and present the at least one ordered wagering game; and
locally executing, via at least one of the one or more processors, the executable wagering game code corresponding to at least one ordered wagering game and presenting the at least one ordered wagering game on one or more local gaming machines connected to the local download manager in accordance with the selected licensing model.

17. The method of claim 16, further comprising authorizing, via at least one of the one or more processors, the administrative user to communication with the remote wagering game store.

18. The method of claim 17, wherein authorizing the administrative user includes receiving user credentials from the administrative user and accessing a customer account corresponding to the received user credentials.

19. The method of claim 16, further comprising receiving, from the administrative user, billing information required by the remote wagering game store.

20. The method of claim 16, further comprising, in response to receiving the wagering game content order, transmitting, to the local download manager via the communications network, licensing content including at least one of data and instructions for enforcing the selected licensing model, and processing, via at least one of the one or more processors, the licensing content to determine if the one or more local gaming machines can present the at least one ordered wagering game.

21. The method of claim 20, further comprising, in response to determining that the one or more local gaming machines cannot present the at least one ordered wagering game, transmitting a termination instruction from the local download manager to the one or more local gaming machines.

22. The method of claim 20, wherein processing the licensing content further determines licensing fees in accordance with the selected licensing model.

23. The method of claim 16, further comprising, in response to receiving the wagering game content order, transmitting, to the local download manager via the communications network, at least one of audio content and video content for use in presenting the ordered wagering game.

24. One or more physical machine-readable storage media including instructions that, when executed by at least one of one or more processors, cause the at least one of the one or more processors to perform operations comprising:
receiving, from an administrative user via a thin client interface connected to the local download manager, a request for available wagering games from the remote wagering game store;
determining a list of stored wagering games available to the administrative user and the licensing models associated with the available wagering games;
displaying, on the thin client interface, the list to the administrative user;
receiving, at the remote wagering game store via the communications network, a wagering game content order from the administrative user including a selection at least one of the available wagering games associated with a plurality of licensing models and a selection of a licensing model of the plurality, wherein each licensing model of the plurality determines licensing fees according to a different set of criteria;
in response to receiving the wagering game content order, transmitting, to the local download manager via the communications network, executable wagering game code needed to execute and present the one or more ordered wagering games; and
locally executing the executable wagering game code corresponding to at least one of the one or more ordered wagering games and presenting the at least one ordered wagering game on one or more local gaming machines connected to the local download manager.

25. The one or more physical machine-readable storage media of claim 24, wherein the one or more local gaming machines operate as thin clients of the local download manager while presenting the ordered wagering game.

26. The one or more physical machine-readable storage media of claim 24, wherein the one or more local gaming machines execute the executable wagering game code corresponding to the ordered wagering game while presenting the ordered wagering game.

27. The one or more physical machine-readable storage media of claim 24, wherein the list of available wagering games is based, at least in part, on the one or more local gaming machines.

28. The one or more physical machine-readable storage media of claim 24, wherein the instructions further cause at least one of the one or more processors to, in response to receiving the wagering game content order, transmit, to the local download manager via the communications network, licensing content including at least one of data and instructions for enforcing the selected licensing model, and process, via at least one of the one or more processors, the licensing content to determine if the one or more local gaming machines can present the at least one ordered wagering game.

29. The one or more physical machine-readable storage media of claim 28, wherein the instructions further cause at least one of the one or more processors to, in response to determining that the one or more local gaming machines cannot present the at least one ordered wagering game, transmit a termination instruction from the local download manager to the one or more local gaming machines.

* * * * *

UNITED STATES PATENT AND TRADEMARK OFFICE
CERTIFICATE OF CORRECTION

| | | |
|---|---|---|
| PATENT NO. | : 8,663,003 B2 | Page 1 of 1 |
| APPLICATION NO. | : 11/379178 | |
| DATED | : March 4, 2014 | |
| INVENTOR(S) | : Blackburn et al. | |

It is certified that error appears in the above-identified patent and that said Letters Patent is hereby corrected as shown below:

In the Claims:

On Column 16, Line 39 (Claim 9, line 28), please delete the "," between "plurality" and "determines".

On Column 16, Line 40 (Claim 9, line 29), please change the ":" after "criteria" to a ";".

Signed and Sealed this
Fifth Day of August, 2014

Michelle K. Lee
*Deputy Director of the United States Patent and Trademark Office*